United States Patent [19]

Gee

[11] Patent Number: 4,987,549

[45] Date of Patent: Jan. 22, 1991

[54] TEMPERATURE COMPENSATED FLOWMETER TECHNIQUES

[75] Inventor: Gregory P. Gee, Drayton Plains, Mich.

[73] Assignee: General Motors Corporation, Detroit, Mich.

[21] Appl. No.: 434,134

[22] Filed: Nov. 13, 1989

[51] Int. Cl.$^5$ .......................... G01F 1/00; G01F 1/68; G01L 1/20; G01C 25/00

[52] U.S. Cl. ................................ 364/510; 364/571.01; 324/DIG. 1; 73/204.18; 73/204.19

[58] Field of Search ............... 364/510, 556, 558, 564, 364/571.01, 571.03; 324/98, DIG. 1; 73/3, 118.2, 204.11, 204.15–204.19, 204.25, 204.27

[56] References Cited

U.S. PATENT DOCUMENTS

| | | | |
|---|---|---|---|
| 4,490,803 | 12/1984 | Briggs | 364/558 X |
| 4,581,929 | 4/1986 | Sugiura | |
| 4,672,847 | 6/1987 | Uchiyama et al. | 73/204.27 X |
| 4,938,061 | 7/1990 | Carp | 73/204.19 X |

OTHER PUBLICATIONS

"Bosch Mass Air Flow Meter: Status and Further Aspects", SAE Paper #840137, Feb. 1984.

"Engine Control System Using a Hot-Wire Air Flow Sensor", Hitachi Review, vol. 31, 1982.

Primary Examiner—Kevin J. Teska
Assistant Examiner—E. J. Pipala
Attorney, Agent, or Firm—Tim G. Jaeger

[57] ABSTRACT

A bridge-type "hot wire" flowmeter is temperature compensated by selecting the values of a power resistor, a ballast resistor and a calibration resistor in accordance with an iterative numerical solution of a pair of equations of the form $$\phi = C5*Ti^5 + C4*Ti^4 + C3*Ti^3 + C2*Ti^2 + C1*Ti + C0$$

$$\phi = K2*Tr^2 + K1*Tr + K0$$

wherein the ideal temperature Ti to which the self-heated resistor should be heated for ideal temperature compensation and the real temperature Tr to which the self-heated resistor is actually heated are specified to be equal at three predetermined values of ambient temperature within the range over which it is desired to temperature compensate the flowmeter.

9 Claims, 2 Drawing Sheets

TEMPERATURE COMPENSATED FLOWMETER TECHNIQUES

This invention relates to a flowmeter of the "hot wire" variety, and more particularly, to techniques for temperature compensating such a flowmeter.

BACKGROUND OF INVENTION

Typically, a "hot wire" type flowmeter includes a self-heated sensor resistor having a resistance Rh which is a function of its temperature. In turn, the temperature of the heated resistor is determined at least in part by the difference between the heat generated within the heated resistor as a function of the voltage applied across the resistor and the heat transferred away from the heated resistor as a function of the amount of cooling fluid flow past the resistor. In addition, it is usual for a "hot wire" flowmeter to include an ambient temperature sensing resistor having a resistance Ra determined by the ambient temperature of the flowing fluid.

In a bridge-type "hot wire" flowmeter, the self-heated resistor and the ambient temperature resistor are connected within a bridge circuit across which a voltage Vb is developed. In terms of fundamental structure, the bridge circuit includes a signal side for deriving a signal voltage Vs which is a voltage divided function of the bridge voltage Vb as determined at least in part by the resistance Rh of the sensor resistor in ratio to the resistance Rp of a power dissipating resistor. The bridge circuit further includes a reference side for defining a reference voltage Vr which is a voltage divided function of the bridge voltage Vb as determined at least in part by the sum (Ra+Rb) of the resistance Ra of the ambient resistor plus the resistance Rb of a ballast resistor in ratio to the resistance Rc of a calibration resistor.

It is common in a bridge-type flowmeter to drive the bridge circuit with an operational amplifier which compares the signal voltage Vs with the reference voltage Vr. More specifically, the amplifier is responsive to the difference between the two voltages Vs and Vr to alter the bridge voltage Vb thereby correspondingly altering the voltage applied across the self-heated resistor so as to change the heat generated within the resistor. As a result, the temperature of the heated resistor and its related resistance Rh are modified such that the signal voltage Vs is equalized with the reference voltage Vr. Under these circumstances, the bridge voltage Vb is indicative of the amount of fluid flow.

In a flowmeter of the above kind, it is desirable that the bridge voltage Vb be temperature compensated over the ambient temperature range. This means that for any given amount of flow, the change in bridge voltage Vb is controlled in a prescribed fashion as the ambient temperature changes. For instance, it may be desirable that the change in bridge voltage Vb be zero over the ambient temperature range. Alternatively, it may be desirable that the bridge voltage Vb change in a predetermined manner over the ambient temperature range so as to cancel or compensate for some inverse temperature responsive change that would be otherwise be induced in the bridge voltage Vb. An example of the latter situation might be where the bridge voltage Vb is fed through a subsequent voltage conditioning circuit that produces an output which is a temperature responsive function of the bridge voltage.

SUMMARY OF INVENTION

The present invention is directed to techniques for temperature compensating the previously described bridge-type flowmeter over the ambient temperature range. The inventive techniques are grounded in three basic tenets. First, for ideal temperature compensation at any given ambient temperature Ta, the self-heated resistor should be heated to an ideal temperature Ti. Second, at any given ambient temperature Ta, the self-heated resistor is actually heated to a real temperature Tr which is ordinarily not equal to the ideal temperature Ti. Third, for optimum temperature compensation over the ambient temperature range, the deviation between the real temperature Tr and the ideal temperature Ti must be minimized.

According to one aspect of the invention, the ideal temperature Ti for the self-heated sensor resistor is related to the ambient temperature Ta by a fifth-order polynomial function of the form $$\emptyset = C5 \cdot Ti^5 + C4 \cdot Ti^4 + C3 \cdot Ti^3 + C2 \cdot iTi2 + C1 \cdot Ti + C\emptyset$$

where the resistance Rp of the power resistor is included among the collective quantities C5, C4, C3, C2, C1 and C$\emptyset$. Similarly, the real temperature Tr of the self-heated sensor resistor is related to the ambient temperature Ta by a third-order polynomial function of the form $$\emptyset = K2 \cdot Tr^2 + K1 \cdot Tr + K\emptyset$$

where the resistance Rb of the ballast resistor and the resistance Rc of the calibration resistor are included among the collective quantities K2, K1 and K$\emptyset$. Finally, the values of the resistances Rp, Rb and Rc are determined through an iterative numerical solution of the above fifth-order and third-order polynomials in which the ideal temperature Ti and the real temperature Tr are specified to be equal at three predetermined values of ambient temperature Ta within the ambient temperature range over which it is desired to temperature compensate the flowmeter. Preferably, the three specified values of ambient temperature Ta are at approximately the mid point and near the end points, respectively, of the ambient temperature range. In the foregoing manner, the invention provides several advantages over the prior art including more precise temperature compensation for any given ambient temperature range, satisfactory temperature compensation over a broader range of ambient temperatures, and effective temperature compensation despite the use of a less precise (lower cost) self-heated sensor resistor.

In another aspect of the invention, the resistance Rp of the power resistor, the resistance Rb of the ballast resistor, and the resistance Rc of the calibration resistor are variable resistances which are adjusted to the values calculated in accordance with the iterative numerical solution of the previously described fifth-order and third-order polynomials. As one example, the resistances Rp, Rb and Rc may be provided in the form of thick-film or thin-film resistors which are laser trimmed to the desired values.

In a further aspect of the invention, one or more resistors may be connected in parallel with the self-heated sensor resistor. This feature provides greater flexibility in defining appropriate values for the resistances Rp, Rb and Rc. To illustrate, because of the vernier resistors, the resistance Rh of the self-heated resistor may be raised in relation to the resistance Rp of the power resistor with the result that more of the bridge voltage Vb is applied across the heated resistor and less is applied across the power dissipating resistor thereby improving the power consumption efficiency of the bridge circuit. Alternatively, employing the vernier resistors, the resistance Rp of the power resistor may be fixed and the resistance of one or more of the vernier resistors may be adjusted instead of adjusting the resistance Rp. In one embodiment, a pair of vernier resistors are connected in series across the self-heated resistor and the signal voltage Vs is tapped from between the two resistors.

BRIEF DESCRIPTION OF DRAWINGS

The foregoing and other aspects and advantages of the invention may be best understood by reference to the following description of the preferred embodiments taken in conjunction with the accompanying drawings in which.

DESCRIPTION OF PREFERRED EMBODIMENTS

As used in the subsequent description and the claims, the symbol ($\emptyset$) means zero and the symbol (*) means multiply.

Figure 1:
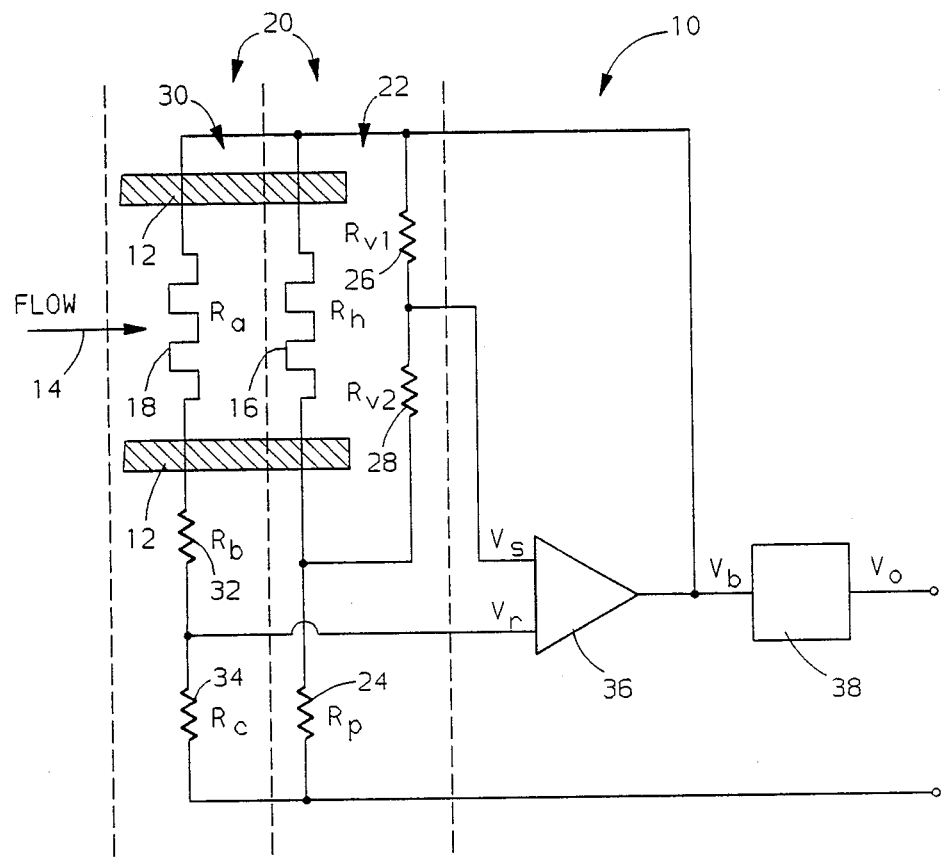
FIG. 1 is a schematic diagram of a flowmeter embodying the principles of the invention.

Referring to FIG. 1, a flowmeter 10 is illustrated for measuring the amount of fluid flow through a conduit 12 which is shown in cross-section. The arrow 14 indicates the direction of flow from left to right. As one example, the fluid may be air and the conduit 12 may be part of the intake passage of an internal combustion engine (not otherwise shown). In the latter event, the flowmeter 10 measures the mass airflow through the conduit 12 into the engine.

The flowmeter 10 is of the "hot wire" variety, i.e., it includes a self-heated sensor resistor 16 having a resistance Rh which is a function of its temperature. Preferably, the heated resistor 16 is mounted within the conduit 12 so as to be exposed to the fluid flow therethrough. The temperature of the heated resistor 16 (and its related resistance Rh) is determined, at least in part, by the difference between the heat generated within the resistor 16 as a function of the voltage applied thereacross and the heat transferred away from the resistor 16 as a function of the cooling fluid flow thereover.

The flowmeter 10 also includes an ambient temperature sensing resistor 18 mounted within the conduit 12. The ambient resistor 18 has a resistance Ra determined by the ambient temperature Ta of the fluid flowing through the conduit 12.

In addition, the flowmeter 10 includes a bridge circuit 20 within which the self-heating resistor 16 and the ambient temperature sensing resistor 18 are connected. In operation, a voltage Vb is developed across the bridge circuit 20 where the magnitude of the bridge voltage Vb is indicative of the amount of fluid flow through the conduit 12.

More specifically, the bridge circuit 20 includes a signal side 22 for deriving a signal voltage Vs which is a voltage divided function of the bridge voltage Vb as determined in part by the resistance Rh of the heated resistor 16 in ratio to the resistance Rp of a power dissipating resistor 24. For reasons which will become more apparent later, in the most general form of the invention, the signal side 22 of the bridge circuit 20 includes first and second vernier resistors 26 and 28 having respective resistances Rv1 and Rv2. The vernier resistors 26 and 28 are connected in series across the heated resistor 16. The signal voltage Vs is tapped from between the resistors 26 and 28.

As a further matter, the bridge circuit 20 includes a reference side 30 for defining a reference voltage Vr which is a voltage divided function of the bridge voltage Vb as determined by the sum (Ra+Rb) of the resistance Ra of the ambient resistor 18 plus the resistance Rb of a ballast resistor 32 in ratio to the resistance Rc of a calibration resistor 34. The reference voltage Vr is tapped from between the resistors 32 and 34.

In addition, the flowmeter 10 includes an operational amplifier 36 for driving the bridge circuit 20. More particularly, the amplifier 36 is responsive to the difference between the signal voltage Vs and the reference voltage Vr to alter the bridge voltage Vb thereby correspondingly altering the voltage applied across the self-heated resistor 16 so as to change the heat generated therein. As a result, the temperature of the heated resistor 16 and its related resistance Rh are modified such that the signal voltage Vs equals the reference voltage Vr (i.e., the difference between the two voltages Vs and Vr is zero).

In the flowmeter 10, it is desirable that the bridge voltage Vb be temperature compensated over the ambient temperature range of the flowing fluid. This means that for any given amount of flow, the change in bridge voltage Vb is controlled in a prescribed fashion as the ambient temperature Ta of the fluid changes. For instance, where the bridge voltage Vb is itself the output of the flowmeter 10, it may be desirable that the change in the bridge voltage Vb be zero over the ambient temperature range. Alternatively, there may be instances where the bridge voltage Vb is fed through a subsequent voltage conditioning circuit 38 (e.g., a voltage offset and gain circuit) to produce an output voltage Vo which is some ambient temperature dependent function of the bridge voltage Vb. In such case, to temperature compensate the flowmeter 10, it is desirable that the bridge voltage Vb change as a function of the ambient temperature Ta in a manner such as to cancel the inverse manner in which the bridge voltage Vb is otherwise changed as a function of the ambient temperature Ta by the voltage conditioning circuit 38.

The present invention is directed to techniques for temperature compensating the bridge voltage Vb over the ambient temperature range of the flowing fluid. The inventive techniques are based upon three principal concepts. First, for ideal temperature compensation at any given ambient temperature Ta, the self-heated resistor 16 should be heated to an ideal temperature Ti. Second, at any given ambient temperature Ta, the self-heated resistor 16 is actually heated to a real temperature Tr which is ordinarily not equal to the ideal temperature Ti. Third, for optimum temperature compensation over the ambient temperature range, the deviation between the real temperature Tr and the ideal temperature Ti must be minimized.

According to the invention, the ideal temperature for the self-heated resistor 16 is related to the ambient temperature Ta by the fifth-order polynomial $$\phi = C5*Ti^5 + C4*Ti^4 + C3*Ti^3 + C2*Ti^2 + C1*Ti + C\phi$$

while the real temperature Tr of the self-heated resistor 16 is related to the ambient temperature Ta by the third-order polynomial $$\phi = K2*Tr^2 + K1*Tr + K\phi$$

where the quantities C5, C4, C3, C2, C1 and C$\phi$ and the quantities K2, K1 and K$\phi$ are defined as follows
C5 = Ka*B4
C4 = Ka*(B3 − Ta*B4)
C3 = Ka*(B2 − Ta*B3)
C2 = Ka*(B1 − Ta*B2) − Vb$^2$*Z
C1 = Ka*(B$\phi$ − Ta*B1) − Vb$^2$*Y
C$\phi$ = Ka*($\phi$ − Ta*B$\phi$) − Vb$^2$*X
Ka = Watts/C° from self-heated resistor 16
B4 = G$^2$*Z$^2$
B3 = G$^2$*2*Y*Z
B2 = 2*G*Rp*Z + G$^2$*(2*X*Z + Y$^2$)
B1 = 2*G*Rp*Y + G$^2$*(2*X*Y)
B$\phi$ = 2*G*Rp*X + G$^2$*X$^2$*Rp$^2$
G = [Rp + (Rv1 + Rv2)]/(Rv1 + Rv2)
K2 = Z
K1 = Y
K$\phi$ = X − [H1/(H2 − H3)]
H1 = (Ra + Rb)*Rp*(Rv1 + Rv2)
H2 = Rc*(Rv1 + Rv2)*(1 − Q)
H3 = (Ra + Rb)*[Rp + Q*(Rv1 + Rv2)]
Q = Rv2/(Rv1 + Rv2)
Ra = Ra$\phi$*(1 + Alpha*Ta + Beta*Ta$^2$)
Rh = Rh$\phi$*(1 + Alpha*Th + Beta*Th$^2$)
X = Rh$\phi$
Y = Rh$\phi$*Alpha
Z = Rh$\phi$*Beta
Ra$\phi$ = Ra at zero °C.
Rh$\phi$ = Rh at zero °C.
Th = Temperature of self-heated resistor 16.

By way of additional explanation, Ka is the heat transfer rate off the self-heating resistor 16 in Watts per degree Celcius. A typical expression for Ka is $$Ka = 30mW/°C*(1 + 1500\ ppm/°C*Ta - 0.8\ ppm/°C/°C*Ta^2).$$

However, due to the complicated nature of some kinds of fluid flow (including air flow) it may not be possible to calculate Ka accurately enough for purposes of the invention. In such event, it will be necessary to determine Ka empirically by laboratory measurement.

Further, Alpha and Beta are constants defined by the respective metals used for the self-heated resistor 16 and for the ambient temperature sensing resistor 18. For example, a typical self-heated resistor 16 made of platinum might have the characteristics
Rh$\phi$ = 20 ohms
Alpha = 3975 ppm/°C.
Beta = −0.59 ppm/°C.$_2$
while a typical ambient temperature sensing resistor 18 made of platinum might have the characteristics
Ra$\phi$ = 1000 ohms
Alpha = 3975 ppm/°C.
Beta = −0.59 ppm/°C.

In addition, it will be appreciated that the resistances Rp, Rb, Rc, Rv1 and Rv2 may each be a separate function of the ambient temperature Ta. For instance, the resistance Rp of the power resistor 24 may take the form $$Rp = Rp\phi*f(Ta)_{Rp}$$

where $f(Ta)_{Rp}$ is a function that describes how the resistance Rp changes with the ambient temperature Ta, e.g., $$f(Ta)_{Rp} = (1 + J1*Ta + J2*Ta^2 + \ldots Jn*Ta^n)$$

where the terms J1, J2 ... Jn are temperature drift terms for the resistance Rp of the power resistor 24. Similar ambient temperature dependent expressions may apply to the resistances Rb, Rc, Rv1 and Rv2.

Returning to the basics of the invention, the minimum deviation between the ideal temperature Ti to which the self-heated resistor 16 should be heated and the real temperature Tr to which the self-heated resistor 16 is actually heated can be achieved by proper calculation of the values of the resistance Rp of the power resistor 24, the resistance Rb of the ballast resistor 32, and the resistance Rc of the calibration resistor 34. Specifically, the desired values of the resistances Rp, Rb and Rc may be determined through an iterative numerical solution to the previously described fifth-order and third-order polynomial functions. For this purpose, any of a number of well known numerical solution methodologies can be employed, such as successive approximation or the Newton-Raphson Method.

For purposes of the numerical solution process, the ideal temperature Ti and the real temperature Tr are specified to be equal at three predetermined values of ambient temperature Ta within the ambient temperature range over which it is desired to temperature compensate the flowmeter 10. Three is the maximum number of points at which the third-order function for the real temperature Tr can be made to match the fifth-order function for the ideal temperature Ti. Preferably, the three specified values of ambient temperature Ta are approximately at the mid point and near the end points of the ambient temperature range.

Figure 2:
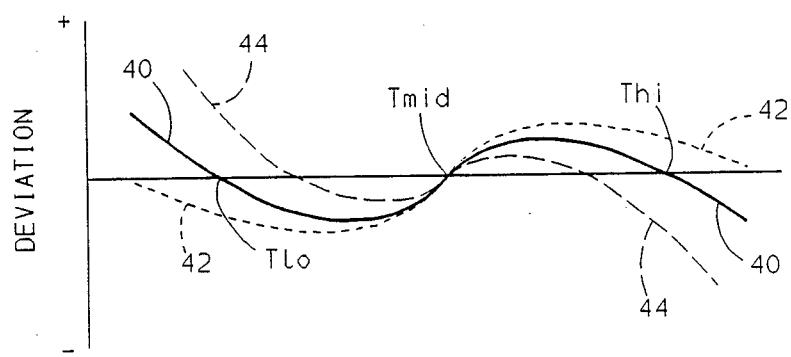
FIG. 2 is a graph useful in explaining the operation of the invention as embodied within FIG. 1.

Referring to FIG. 2, the solid line 40 shows the general form of the relative deviation (Tr−Ti) to be expected between the real temperature Tr and the ideal temperature Ti where the three specified values of ambient temperature Ta are a low temperature Tlo, a high temperature Thi, and an intermediate temperature Tmid. Where the flowmeter 10 is applied to measure the mass airflow into an internal combustion engine, typical specified temperature values might be: Tlo = 40° C., Thi = +120° C., and Tmd = +20° C. As the selected high and low ambient temperature values Thi and Tlo are spaced farther away from the selected intermediate ambient temperature value Tmid, the positive and negative peaks of the deviation curve increase while the slope of the skirts of the curve decrease. To illustrate, the dashed curve 42 corresponds to selected high and low ambient temperature values above and below Thi and Tlo, respectively, while dashed curve 44 corresponds to selected high and low temperature values below and above Thi and Tlo, respectively.

One possible method (but not the only one) for obtaining an iterative numerical solution of the fifth-order polynomial respecting the ideal temperature Ti and the third-order polynomial respecting the real temperature Tr involves a ten step process as follows:

Step (1). Select the three values of ambient temperature Ta (i.e., high temperature Thi, low temperature Tlo, and intermediate temperature Tmid) at which the real temperature Tr and the ideal temperature Ti are to be equal.

Step (2). Select an initial value for the resistance Rp of the power resistance 24 (e.g., equal to the resistance Rh of the self-heating resistor 16 at 0° C.).

Step (3). Select a value for Q (typically between zero and 0.1) for the voltage tap ratio provided across the self-heated resistor 16 by the vernier resistors 26 and 28.

Step (4). Select values for the resistances Rv1 and Rv2 of the first and second vernier resistors 26 and 28.

Step (5). Select either a value for the bridge voltage Vb at Tmid (e.g., nine volts at an air flow of 140 g/sec), or select (Ti−Ta) evaluated at Tmid; and then calculate the other quantity from the expression $$Vb^2 = \frac{Ka(Ti - Ta)*(B4*Ti^4 + B3*Ti^3 + B2*Ti^2 + B1*Ti + B0)}{Z*Ti^2 + Y*Ti + X}$$

which is derived from the fifth-order polynomial.

Step (6). Employing the previously selected and calculated values, calculate the ideal temperature Ti of the self-heated resistor 16 at the selected value of intermediate temperature Tmid using the fifth-order polynomial.

Step (7). Employing the previously selected and calculated values, calculate the ideal temperature Ti of the self-heated resistor 16 at the selected value of high temperature Thi using the fifth-order polynomial.

Step (8). Employing the previously calculated values for Ti at Tmid and Ti at Thi, calculate the resistances Rb and Rc using the third-order polynomial under the two conditions: Tr=Ti at Ta=Tmid, and Tr=Ti at Ta=Thi.

Step (9). Employing the values for the resistances Rb and Rc calculated in Step (8), calculate the ideal temperature Ti at the selected value of low temperature Tlo using the fifth order polynomial and calculate the real temperature Tr at the selected value of low temperature Tlo using the third-order polynomial.

Step (10). If the ideal temperature Ti and the real temperature Tr calculated in Step (9) are not equal, select a new value for the resistance Rp using a numerical method (e.g., successive approximation, Newton-Raphson) and repeat the process from Step (6) through Step (9) until the two values calculated in Step (9) are equal. The final calculated values for Rp, Rb and Rc are the values required to temperature compensate the flowmeter 10.

Among the advantages provided by the invention over the prior art are more precise temperature compensation for any given ambient temperature range, satisfactory temperature compensation over a broader range of ambient temperatures (e.g., −40° C. to +120° C.), and effective temperature compensation using a self-heated resistor 16 having less precise (less costly) temperature characteristics. In the latter respect, typical tolerances applicable to the heated resistor 16 in the absence of the invention might be Rh$\emptyset$ at 0° C., ±2%
Alpha, ±2%
Beta, <1 ppm
while typical tolerances enabled by the invention might be
Rh$\emptyset$ at 0° C., ±20%
Alpha, ±20%
Beta, <20 ppm The tighter tolerances necessitated by the prior art would likely require that the heated resistor 16 be made of a high cost precious metal such as platinum in bulk form. The looser tolerances enabled by the invention can be met by almost any low cost metal such as nickel, copper, or various alloys, which may be provided in sputtered or foil form rather than bulk form.

Figure 3:
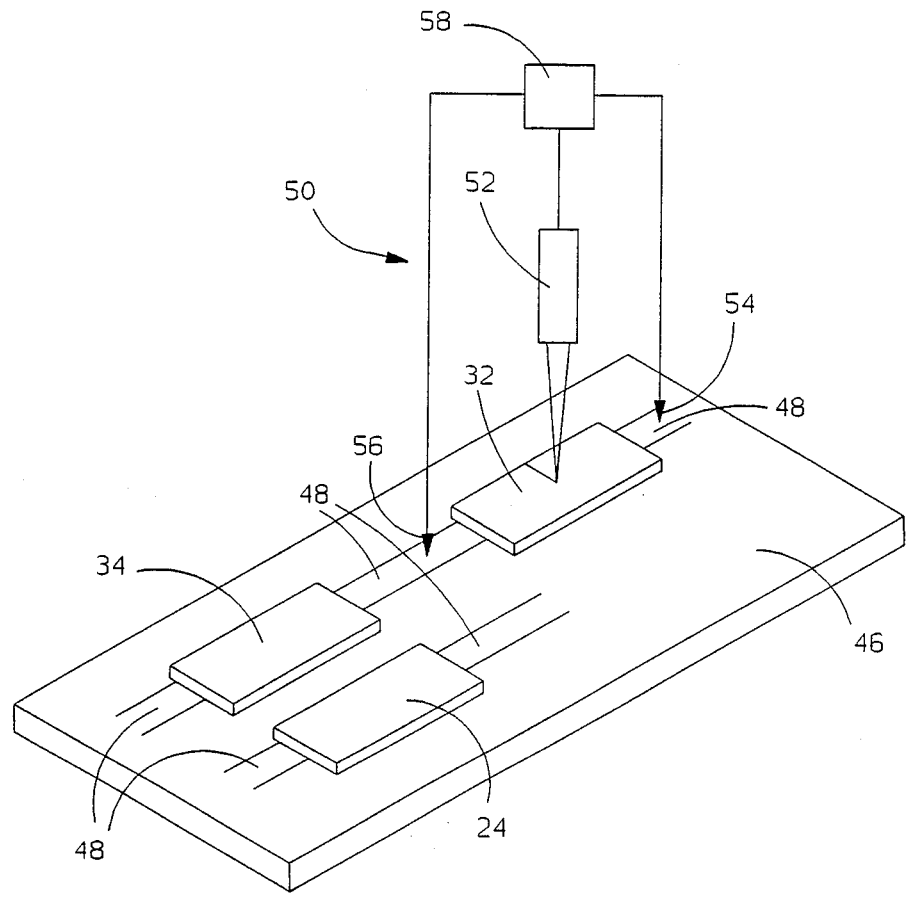
FIG. 3 is a schematic diagram useful in explaining certain circuit fabrication aspects of the invention.

In another aspect of the invention, the resistance Rp of the power resistor 24, the resistance Rb of the ballast resistor 32, and the resistance Rc of the calibration resistor 34 are variable resistances which are adjusted to the values calculated in accordance with the previously described aspects of the invention. As one example, shown schematically in FIG. 3, the resistors 24, 32 and 34 may be provided in the form of thick-film or thin-film resistors which are fabricated on a substrate 46 and interconnected by conductive leads 48. The resistances Rp, Rb and Rc of the resistors 24, 32 and 34 are individually trimmed to the desired values by a laser trimming apparatus 50 which includes a laser 52 for trimming the resistors 24, 32 and 34 (e.g., vaporizing a slit in the resistor), a pair of probes 54 and 56 for monitoring the resistances Rp, Rb and Rc during the laser trimming process, and a control unit 58 for controlling the laser 52 to trim the resistors 24, 32 and 34 to the desired values for the resistances Rp, Rb and Rc.

Further, it is to be noted that the vernier resistors 26 and 28 provide three options in respect to circuit simplification versus flexibility in temperature compensation. Option #1 utilizes both vernier resistors 26 and 28 in the bridge circuit 20. Option #2 involves setting Rv2 equal to zero thereby eliminating the second vernier resistor 28 such that the remaining vernier resistor 26 is connected in parallel with the self-heated resistor 16 and the signal voltage Vs is tapped from between the heated resistor 16 and the power resistor 24. Option #3, which is additive to Option #2, is to set Rv1 equal to infinity thereby also eliminating the first vernier resistor 26. Each of these successive options has the advantage of simplifying the circuitry, but the corresponding disadvantage of reducing the greater flexibility otherwise provided by the vernier resistors 26 and 28 in respect to defining appropriate values for the resistances Rp, Rb and Rc. The increased flexibility referred to above derives from the action of the vernier resistors 26 and 28 in changing the effective voltage divider ratio between the self-heated resistor 16 and the power resistor 24 as a function of the temperature of the heated resistor 16.

One advantage of the two resistors 26 and 28 in Option #2, or the single resistor 26 in Option #3, is that the resistance Rh of the self-heated resistor 16 may be raised in relation to the resistance Rp of the power resistor 24 such that more of the bridge voltage Vb is applied across the heated resistor 16 and less is applied across the power resistor 24. As a result, less power is dissipated by the bridge circuit 20 because a greater portion of the power is usefully consumed by the sensor resistor 16 and a lesser portion of the power is wastefully dissipated in the power resistor 24.

Another advantage of the two resistors 26 and 28 in Option #2, or the single resistor 26 in Option #3, is that the resistance Rp of the power resistor 24 can be fixed and one or both of the resistances Rv1 and Rv2 can be adjusted in place of adjusting the resistance Rp. In such event, the value of the resistance Rp would be specified and the values of the resistances Rv1 and Rv2 would be calculated and then the resistors 26 and 28 would be adjusted or trimmed to the calculated values. This may be more desireable, from a manufacturing or other standpoint, than having to adjust the power dissipating resistor 24.

It is to be noted that the foregoing description is presented by way of illustration and not by way of undue limitation. Various modifications and alterations to the described embodiments are possible without departing from the spirit and scope of the invention.

What is claimed is:

1. An apparatus for measuring the amount of flow of a flowing medium comprising:

a bridge circuit across which a bridge voltage Vb is developed such that the magnitude of the bridge voltage Vb is indicative of the amount of flow, the bridge circuit including a signal side for deriving a signal voltage Vs which is a voltage divided function of the bridge voltage Vb as determined at least in part by the resistance Rh of a self-heated resistor in ratio to the resistance Rp of a power resistor where the resistance Rh is related to the temperature of the heated resistor as determined at least in part by the difference between the heat generated within the heated resistor as a function of the voltage applied across the resistor and the heat transferred away from the heated resistor as a function of the amount of fluid flow, the signal side of the bridge circuit also including first and second vernier resistors having respective resistances Rv1 and Rv2 where the vernier resistors are connected in series across the self-heated resistor such that the first vernier resistor is connected to the high voltage end of the heated resistor while the second vernier resistor is connected to the low voltage end of the heated resistor and where the signal voltage Vs is derived from between the vernier resistors, the bridge circuit also including a reference side for defining a reference voltage Vr which is a voltage divided function of the bridge voltage Vb as determined at least in part by the sum (Ra+Rb) of the resistance Ra of an ambient resistor plus the resistance Rb of a ballast resistor in ratio to the resistance Rc of a calibration resistor where the resistance Ra of the ambient resistor is determined by the ambient temperature Ta of the flowing medium, and an amplifier responsive to the difference between the signal voltage Vs and the reference voltage Vr for altering the bridge voltage Vb to alter the heat generated within the self-heated resistor thereby altering its temperature and related resistance Rh so as to equalize the signal voltage Vs and the reference voltage Vr, the resistances Rp, Rb and Rc having values determined by an iterative numerical solution of the equations $$\emptyset = C5*Ti^5 + C4*Ti^4 + C3*Ti^3 + C2*Ti^2 + C1*Ti + C\emptyset$$

$$\emptyset = K2*Tr^2 + K1*Tr + K\emptyset$$

in which the ideal temperature Ti to which the self-heated resistor should be heated for ideal temperature compensation and the real temperature Tr to which the self-heated resistor is actually heated by the bridge circuit are specified to be equal at three predetermined values of ambient temperature Ta within the ambient temperature range over which it is desired to temperature compensate the flowmeter where $C5 = Ka*B4$
   $C4 = Ka*(B3 - Ta*B4)$
   $C3 = Ka*(B2 - Ta*B3)$
   $C2 = Ka*(B1 - Ta*B2) - Vb^2*Z$
   $C1 = Ka*(B0 - Ta*B1) - Vb^2*Y$
   $C\emptyset = Ka*(\emptyset - Ta*B0) - Vb^2*X$
   $Ka = Watts/C.°$ from self-heated resistor 16
   $B4 = G^2*Z^2$
   $B3 = G^2*2*Y*Z$
   $B2 = 2*G*Rp*Z + G^2*(2*X*Z + Y^2)$
   $B1 = 2*G*Rp*Y + G^2*(2*X*Y)$
   $B\emptyset = 2*G*Rp*X + G^2*X^2*Rp^2$
   $G = [Rp + (Rv1 + Rv2)]/(Rv1 + Rv2)$
   $K2 = Z$
   $K1 = Y$
   $K\emptyset = X - [H1/(H2 - H3)]$
   $H1 = (Ra + Rb)*Rp*(Rv1 + Rv2)$
   $H2 = Rc*(Rv1 + Rv2)*(1 - Q)$
   $H3 = (Ra + Rb)*[Rp + Q*(Rv1 + Rv2)]$
   $Q = Rv2/(Rv1 + Rv2)$
   $Ra = Ra\emptyset*(1 + Alpha*Ta + Beta*Ta^2)$
   $Rh = Rh\emptyset*(1 + Alpha*Th + Beta*Th^2)$
   $X = Rh\emptyset$
   $Y = Rh\emptyset*Alpha$
   $Z = Rh\emptyset*Beta$
   $Ra\emptyset = Ra$ at zero °C.
   $Rh\emptyset = Rh$ at zero °C.
   $Th =$ Temperature of self-heated resistor 16.

such that the deviation between the real temperature Tr and the ideal temperature Ti is minimized over the ambient temperature range.

2. The apparatus of claim 1 in which the resistance Rv2 is zero thereby eliminating the second vernier resistor.

3. The apparatus of claim 2 in which the resistance Rv1 is infinite thereby eliminating the first vernier resistor.

4. The apparatus of claims 1, 2 or 3 in which the three values of ambient temperature are selected to be approximately at the midpoint and near the end points of the ambient temperature range over which it is desired to temperature compensate the flowmeter.

5. As applied to an apparatus for measuring the amount of flow of a flowing medium including:

a bridge circuit across which a bridge voltage Vb is developed such that the magnitude of the bridge voltage Vb is indicative of the amount of flow, the bridge circuit including a signal side for deriving a signal voltage Vs which is a voltage divided function of the bridge voltage Vb as determined at least in part by the ratio of the resistance Rh of a self-heated resistor to the adjustable resistance Rp of a power resistor where the resistance Rh is related to the temperature of the heated resistor as determined at least in part by the difference between the heat generated within the heated resistor as a function of the voltage applied across the resistor and the heat transferred away from the heated resistor as a function of the amount of fluid flow, the signal side of the bridge circuit also including first and second vernier resistors having respective resistances Rv1 and Rv2 where the vernier resistors are connected in series across the self-heated resistor such that the first vernier resistor is connected to the high voltage end of the heated resistor while the second vernier resistor is connected to the low voltage end of the heated resistor and where the signal voltage Vs is tapped from between the vernier resistors, the bridge circuit also including a reference side for defining a reference voltage Vr which is a voltage divided function of the bridge voltage Vb as determined at least in part by the ratio of the sum (Ra+Rb) of the resistance Ra of an ambient resistor plus the adjustable resistance Rb of a ballast resistor to the adjustable resistance Rc of a calibration resistor where the resistance Ra of the ambient resistor is determined by the ambient temperature Ta of the flowing medium, and an amplifier responsive to the difference between the signal voltage Vs and the reference voltage Vr for altering the bridge voltage Vb to alter the heat generated within the self-heated resistor thereby altering its temperature and related resistance Rh so as to bring the signal voltage Vs into conformance with the reference voltage Vr;

the method comprising the steps of:

calculating values for the resistances Rp, Rb and Rc by an iterative numerical solution of the equations $$\emptyset = C5*Ti^5 + C4*Ti^4 + C3*Ti^3 + C2*Ti^2 + C1*Ti + C\emptyset$$

$$\emptyset = K2*Tr^2 + K1*Tr + K\emptyset$$

in which the ideal temperature Ti to which the self-heated resistor should be heated for ideal temperature compensation and the real temperature Tr to which the self-heated resistor is actually heated by the bridge circuit are specified to be equal at three predetermined values of ambient temperature Ta within the ambient temperature range over which it is desired to temperature compensate the flowmeter where C5 = Ka*B4
C4 = Ka*(B3 − Ta*B4)
C3 = Ka*(B2 − Ta*B3)
C2 = Ka*(B1 − Ta*B2) − Vb$^2$*Z
C1 = Ka*(B$\emptyset$ − Ta*B1) − Vb$^2$*Y
C0 = Ka*($\emptyset$ − Ta*B0) − Vb$^2$*X
Ka = Watts/C.° from self-heated resistor 16
B4 = G$^2$*Z$^2$
B3 = G$^2$*2*Y*Z
B2 = 2*G*Rp*Z + G$^2$*(2*X*Z + Y$^2$)
B1 = 2*G*Rp*Y + G$^2$*(2*X*Y)
B0 = 2*G*Rp*X + G$^2$*X$^2$*Rp$^2$
G = [Rp + (Rv1 + Rv2)]/(Rv1 + Rv2)
K2 = Z
K1 = Y
K$\emptyset$ = X − [H1/(H2 − H3)]
H1 = (Ra + Rb)*Rp*(Rv1 + Rv2)
H2 = Rc*(Rv1 + Rv2)*(1 − Q)
H3 = (Ra + Rb)*[Rp + Q*(Rv1 + Rv2)]
Q = Rv2/(Rv1 + Rv2)
Ra = Ra$\emptyset$*(1 + Alpha*Ta + Beta*Ta$^2$)
Rh = Rh$\emptyset$*(1 + Alpha*Th + Beta*Th$^2$)
X = Rh$\emptyset$
Y = Rh$\emptyset$*Alpha
Z = Rh$\emptyset$*Beta
Ra$\emptyset$ = Ra at zero °C.
Rh$\emptyset$ = Rh at zero °C.
Th = Temperature of self-heated resistor 16 and adjusting the resistances Rp, Rb and Rc to the respective calculated values with the result that the deviation between the real temperature Tr and the ideal temperature Ti is minimized over the ambient temperature range.

6. The method of claim 5 in which the resistance Rv2 is zero thereby eliminating the second vernier resistor.

7. The method of claim 5 in which the resistance Rv1 is infinite thereby eliminating the first vernier resistor.

8. The method of claim 5 in which the value of the resistance Rp is specified rather than being calculated and the value of at least one of the resistances Rv1 and Rv2 is calculated and the corresponding one of the first and second vernier resistors is adjusted to the calculated value.

9. The method of claims 5, 6, 7 or 8 in which the three values of ambient temperature are selected to be approximately at the mid point and the end points of the ambient temperature range over which it is desired to temperature compensate the flowmeter.

* * * * *